United States Patent Office 3,102,889
Patented Sept. 3, 1963

3,102,889
THERMALLY STABLE FLUOROCARBON COMPOUNDS
Edward Karcher Gladding, New Castle, and David Carroll Remy, Wilmington, Del., assignors to E. I. du Pont de Nemours and Company, Wilmington, Del., a corporation of Delaware
No Drawing. Filed June 28, 1960, Ser. No. 39,232
2 Claims. (Cl. 260—308)

The present invention is directed to new fluorocarbon compounds exhibiting outstanding thermal stability which are significantly useful as heat transfer media.

Fluorinated organic compounds are acquiring increasing technical and commercial importance.

It is an object of the present invention to provide new fluorocarbon compounds having excellent thermal stability. It is a further object to provide new heterocyclic compounds having highly fluorinated side chains. It is a still further object to provide amide azine compounds having highly fluorinated substituents. It is still an additional object to provide processes for making these compounds.

These and other objects will become apparent in the following description and claims.

More specifically, the present invention is directed to compounds having the structure

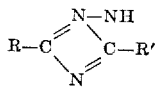

wherein R and R' are perfluoroalkyl, ω-hydroperfluoroalkyl, or ω-chloroperfluoroalkyl radicals; with the proviso that there are at least 3 carbon atoms in R; R and R' can be the same or different.

The term "perfluoroalkyl radical" used heretofore has the customary meaning; that is, it refers to an alkyl radical wherein all the hydrogen atoms have been replaced by fluorine atoms. A perfluoroalkyl radical, accordingly, contains only carbon and fluorine atoms; the carbon atoms therein are joined by carbon-to-carbon single bonds; each fluorine atom therein is joined only to a carbon atom. The ω-hydroperfluoroalkyl radicals and the ω-chloroperfluoroalkyl radicals are identical to perfluoroalkyl radicals except that a single hydrogen or a single chlorine atom, respectively, is present and is located at the end of the radical chain.

Representative examples of the present novel compounds having a 1,2,4-triazole ring are:
3,5-bis(perfluoropropyl)-1,2,4-triazole;
3,5-bis(perfluoroisopropyl)-1,2,4-triazole;
3,5-bis(perfluoro-n-butyl)-1,2,4-triazole;
3,5-bis(perfluoro-n-pentyl)-1,2,4-triazole;
3,5-bis(perfluoro-n-heptyl)-1,2,4-triazole;
3,5-bis(perfluoro-n-nonyl)-1,2,4-triazole;
3,5-bis(perfluoro-n-undecyl)-1,2,4-triazole;
3,5-bis(perfluoro-n-tridecyl)-1,2,4-triazole;
3-perfluoro-n-butyl-5-perfluoro-n-hexyl-1,2,4-triazole;
3-perfluoro-n-pentyl-5-perfluoro-n-nonyl-1,2,4-triazole;
3,5-bis(ω-hydroperfluoro-n-butyl)-1,2,4-triazole;
3,5-bis(ω-hydroperfluoro-n-hexyl)-1,2,4-triazole;
3,5-bis(ω-hydroperfluoro-n-octyl)-1,2,4-triazole;
3,5-bis(ω-hydroperfluoro-n-decyl)-1,2,4-triazole;
3,5-bis(ω-hydroperfluoro-n-dodecyl)-1,2,4-triazole;
3,5-bis(ω-chloroperfluoropropyl)-1,2,4-triazole;
3,5-bis(ω-chloroperfluoro-n-nonyl)-1,2,4-triazole;
3-ω-hydroperfluoro-n-butyl-5-ω-hydroperfluoro-n-octyl-1,2,4-triazole;
3-ω-chloroperfluoropropyl-5-ω-chloroperfluoro-n-nonyl-1,2,4-triazole; and
3-ω-hydroperfluoro-n-butyl-5-ω-chloroperfluoro-n-heptyl-1,2,4-triazole.

The 1,2,4-triazoles (V) of the present invention are made by heating the corresponding perfluoroacylamide perfluoroacylhydrazone (VI)

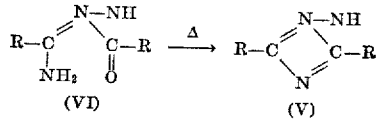

which, in turn, is prepared from the base catalyzed condensation of the known perfluoroamidrazones (VII) with the suitable known perfluoroalkylacid chloride (VIII)

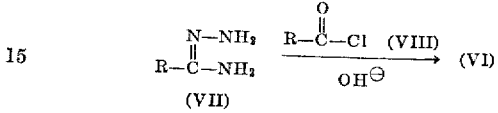

The perfluoroacylamidrazones (VII) are prepared by mixing the corresponding perfluoroalkylnitrile with at least an equimolar amount of hydrazine hydrate at atmospheric pressure at about −78° C. (crushed solid carbon dioxide is used for a cooling bath). Excess hydrazine hydrate is often supplied as a solvent. The mixture is subsequently allowed to warm to room temperature over a period of about an hour. Finally, water is added and the precipitated amidrazone is collected by filtration.

The perfluoroacylamide-perfluoroacyl hydrazones (VI) are made by mixing the amidrazones at room temperature at atmospheric pressure with at least a molar equivalent of a perfluoroacyl chloride in the presence of an acid acceptor such as aqueous potassium hydroxide. The product is collected by filtration. Unsymmetrical perfluoroacylamide-perfluoroacyl hydrazones can be prepared by employing reactants with unlike perfluoroalkyl groups.

The 1,2,4-triazoles heretofore described are obtained by heating the above perfluoroacylamide-perfluoroacyl hydrazones in an evacuated autoclave at about 150–200° C. for several hours. The cyclization is undesirably slow at temperatures below 150° C.; temperatures above 200° C. usually provide no added advantage.

It is to be understood that the ω-chloroperfluoroalkyl and the ω-hydroperfluoroalkyl substituted compounds of the present invention can be made by the procedures given for the analogous perfluoroalkyl compound.

A representative example illustrating the present invention follows; the product melting point in the example is in degrees centigrade.

EXAMPLE

*Part A.* — *Heptafluorobutyroamidrazone:* A round-bottom flask containing 20 ml. of 100% hydrazine hydrate was equipped with a Dry Ice condenser. After cooling the flask in Dry Ice, heptaflourobutyronitrile prepared by phosphorous pentoxide dehydration of 10.5 g. (0.0493 mole) of heptafluorobutyramide, was poured into the flask. The mixture solidified within a few minutes. The Dry Ice bath was removed, and the mixture allowed to warm to room temperature for one hour. Water (250 ml.) was added and the white crystalline precipitate was removed by filtration. The precipitate was dissolved in warm benzene and dried over magnesium sulfate for 15 minutes. The warm benzene solution was filtered, and on cooling the benzene filtrate heptafluorobutyroamidrazone crystallized. There was obtained 5.81 g. of material. Analytically pure heptafluorobutyroamidrazone was obtained by recrystallization from benzene, M.P. 71.5–72.5° C.

*Analysis.*—Calcd. for $C_4H_4F_7N_3$: C, 21.15; H, 1.78; F, 58.57; N, 18.50. Found: C, 21.05, 21.19; H, 1.79, 1.74; F, 58.2, 58.2; N, 18.5, 18.5.

*Part B.*—*Heptafluorobutyramide heptafluorobutyrylhydrazone:* To a suspension of 6.69 g. (0.0295 mole) of heptafluorobutyroamidrazone in 75 ml. of water was added several drops of heptafluorobutyryl chloride. Several drops of an aqueous 15% potassium hydroxide solution were immediately added and the reaction mixture shaken vigorously. The heptafluorobutyryl chloride and potassium hydroxide solution were added in this manner, intermittently and with vigorous shaking, until a total of 7.42 g. (0.0319 mole) of the acid chloride and 15 ml. of the potassium hydroxide solution had been added. After each increment of addition and shaking, the mixture was tested to Congo red paper to make certain the mixture was basic. At the end of the additions, the white precipitate was removed by filtration, washed with 150 ml. of water, and allowed to dry. There was obtained 7.30 g. of heptafluorobutyramide heptafluorobutyrylhydrazone; three recrystallizations from a benzene-ethyl acetate solvent pair gave analytically pure material, M.P. 136–137° C.

*Analysis.*—Calcd. for $C_8H_3F_{14}N_3O$: C, 22.71; H, 0.71; F, 62.87; N, 9.93. Found: C, 22.7, 22.9; H, 0.73, 0.78; F, 63.5, 63.7; N, 10.0, 9.8.

*Part C. — 3,5-bis-(heptafluoropropyl)-1,2,4-triazole:* Into each of two 8″ test tubes was placed 3.0 g. (0.007 mole) of heptafluorobutyramide heptafluorobutyrylhydrazone. The tubes were evacuated on a vacuum pump to 0.1 mm., sealed under vacuum, and then heated in an oil bath at 172–197° C. for four hours. After cooling, the tubes were opened, the contents dissolved in ether, the ether phases combined and dried over magnesium sulfate. After filtering, the ether was evaporated leaving a white crystalline residue. Recrystallization from benzene gave pure 3,5-bis(heptafluoropropyl)-1,2,4-triazole, M.P. 111–112° C. (Yield=89%, ECJ, 38–65.)

*Analysis.*—Calcd. for $C_8HF_{14}N_3$: C, 23.72; H, 0.25; F, 65.66; N, 10.37. Found: C, 23.8, 24.0; H, 0.29, 0.14; F, 65.6, 65.6; N, 10.6, 10.6.

The neutralization equivalent of 3,5-bis(heptafluoropropyl)-1,2,4-triazole was obtained by titrating a 70% aqueous ethanol solution to a phenolphthalein end point. $C_8HF_{14}N_3$ requires 405.1. Found: 415.

The silver salt of 3,5-bis-(heptafluoropropyl)-1,2,4-triazole was prepared and recrystallized from acetone.

*Analysis.*—Calcd. for $C_8F_{14}N_3Ag$: Ag, 21.07. Found: Ag, 21.0, 21.7.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The compound 3,5-bis-(heptafluoropropyl)-1,2,4-triazole.
2. A compound of the formula

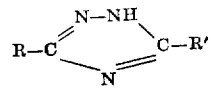

in which compounds R and R' are radicals selected from the group consisting of perfluoroalkyl, ω-hydroperfluoroalkyl and ω-chloroperfluoroalkyl radicals, with the proviso that there are from 3 to 13 carbon atoms in said R and R' radicals.

No references cited.

UNITED STATES PATENT OFFICE
CERTIFICATE OF CORRECTION

Patent No. 3,102,889 September 3, 1963

Edward Karcher Gladding et al.

It is hereby certified that error appears in the above numbered patent requiring correction and that the said Letters Patent should read as corrected below.

Column 1, lines 28 to 31, the formula should appear as shown below instead of as in the patent:

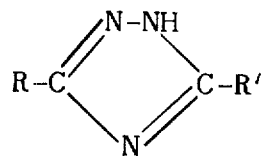

column 2, lines 4 to 7, the equation should appear as shown below instead of as in the patent:

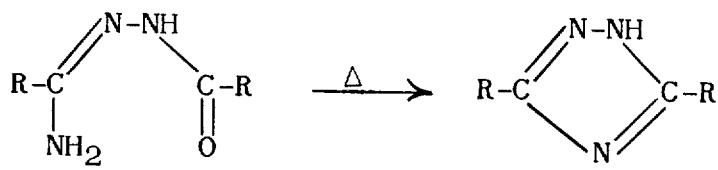

Signed and sealed this 5th day of May 1964.

(SEAL)
Attest:

ERNEST W. SWIDER
Attesting Officer

EDWARD J. BRENNER
Commissioner of Patents